United States Patent [19]

Kawashima et al.

[11] 4,227,422
[45] Oct. 14, 1980

[54] CHAIN DEVICE

[75] Inventors: Yoshinori Kawashima, Sakado; Masaki Watanabe, Niiza, both of Japan

[73] Assignee: Honda Giken Kogyo Kabushiki Kaisha, Tokyo, Japan

[21] Appl. No.: 40,437

[22] Filed: May 18, 1979

[30] Foreign Application Priority Data

May 19, 1978 [JP] Japan ............................ 53/67297[U]

[51] Int. Cl.³ .............................................. F16H 55/30
[52] U.S. Cl. .................................... 474/156; 198/834; 198/843; 474/161
[58] Field of Search .................. 305/57; 74/229, 219, 74/240, 243 S, 243 R, 245 S, 250 S, 245 LP; 198/834, 843

[56] References Cited

U.S. PATENT DOCUMENTS

| 2,003,528 | 6/1935 | Best | 305/57 |
|---|---|---|---|
| 3,597,985 | 8/1971 | Jeffrey | 74/229 |
| 3,958,837 | 5/1976 | Chagawa | 74/243 R |
| 4,034,618 | 7/1977 | Groff et al. | 74/243 R |
| 4,087,136 | 5/1978 | Boggs et al. | 305/57 |
| 4,141,602 | 2/1979 | Boggs et al. | 305/57 |

Primary Examiner—C. J. Husar
Assistant Examiner—Conrad Berman
Attorney, Agent, or Firm—Irving M. Weiner; John L. Shortley; Melvin Yedlin

[57] ABSTRACT

A chain device including a sprocket wheel, a buffer ring provided on one side of the sprocket wheel for rotation relative thereto, and a chain meshing therewith. The buffer ring has an outer diameter greater than the inner-diameter dimension of a semicircular-shaped portion of the chain which is in meshing engagement with the sprocket wheel. Thus, when the chain and sprocket wheel are in meshing engagement with each other, the buffer ring is restrained and forced by the inner-diameter part of the semicircular-shaped portion of the chain, so that the ring is deformed into an elliptical shape. Each of the link plates which form the chain includes a depressed portion having a curved shape coinciding, in its radius of curvature, to the maximum radius of curvature of the elliptically-deformed buffer ring. Such curved shape of the depressed portion of the link plate contributes to the improvement of durability of the buffer ring, as well as to reduction of chain noise.

7 Claims, 4 Drawing Figures

CHAIN DEVICE

BACKGROUND OF THE INVENTION

1. Field of the Invention

The present invention relates generally to chain devices and, more particularly, to a chain device in which noise produced at the time of meshing engagement of the chain with the sprocket wheel is reduced by a buffer ring provided on one side of the sprocket wheel.

2. Description of Related Art

A chain, such as one used for power transmission on a motorcycle or the like and coupled to "drive" and "driven" sprocket wheels in mesh therewith, is normally passed around such sprocket wheels in a slack state and is suddenly brought into meshing engagement with the sprocket wheels as it is run therebetween. Therefore, each time the chain is forced into meshing engagement with each sprocket wheel, impact sounds consisting mainly of high frequency components are produced as a result of collision between the two metal parts. A generally known means for solving such chain noise problems makes use of the compressive deformation of rubber or the like for absorbing shocks at the time of meshing of the chain, and consequently wear problems are likely to arise. Particularly, when the buffer member formed of rubber or the like is provided on the drive sprocket wheel rather than the driven sprocket wheel by means of baking, premature wear will result due to great load conditions, which is a drawback from the standpoint of durability. Without such sacrifice of durability, no reliable noise prevention effect can be expected with such known means.

In order to afford a solution to the above problems, the present inventors have proposed a chain noise prevention device as disclosed in Japanese Utility Model Application No. 71829/1977 filed June 2, 1977, which corresponds to United States Patent Application Ser. No. 909,517 filed May 25, 1978 and entitled "CHAIN NOISE PREVENTING DEVICE." In such device, a buffer ring having an outer diameter greater than the inner-diameter dimension of a semicircular-shaped portion of the chain which is in mesh with a sprocket wheel is held on one side of the sprocket wheel by a retainer member secured to the same side of the sprocket wheel. With such construction, at the time of meshing engagement of the chain with the sprocket, a radially inner portion of each link of the chain is brought into engagement with the outer periphery of the buffer ring to alleviate the impact between the chain and sprocket wheel. In addition, the buffer ring is deformed at such time to absorb the impact energy, thereby further preventing the generation of impact sounds, and reducing noise.

The present invention provides improvements over the above-described proposed chain noise prevention device, so as to further promote noise prevention and to enhance the durability of the buffer ring.

Because the above-mentioned buffer ring has an outer diameter greater than the inner diameter of a semicircular-shaped portion of the chain which is in mesh with the sprocket wheel, with the meshing engagement between the chain and sprocket wheel the buffer ring restrained by the radially inner part of the semicircular chain portion is deformed into a substantially elliptical form and protrudes toward the non-restrained side. The buffer ring has a base formed of a plate spring member, so that at the time of such meshing engagement the restoring resilient force of the spring acts in the direction of the minor axis of the ellipse. The portion of the elliptically formed buffer ring traversing the minor axis thereof substantially coincides with a portion of the chain corresponding to the start of the meshing engagement between the chain and sprocket wheel at the time of forward or reverse running. Thus, the restoring resilient force of the buffer ring acts as a spring load upon the mesh start portion of the chain, with the buffer ring and chain engaging each other to produce a maximum contact pressure therebetween in such portion. Accordingly, if smooth engagement of the outer periphery of the buffer ring with the inner periphery of the semicircular chain portion can be obtained in such portion, it is possible to further reduce the chain noise compared with prior art means, and also to minimize wear of the buffer ring to enhance the durability thereof.

SUMMARY OF THE INVENTION

The present invention provides a chain device which includes a sprocket wheel, a buffer ring provided on one side of the sprocket wheel for rotation relative thereto, and a chain meshing with the sprocket wheel and formed by a plurality of link plate pairs. The buffer ring has an outer diameter greater than the inner diameter dimension of a semicircular-shaped portion of the chain which is in mesh with the sprocket wheel. Each of the link plates is provided with a depressed portion having a curved shape coinciding in its radius of curvature with the maximum radius of curvature of the outer periphery of the buffer ring which is elliptically deformed by the meshing engagement between the chain and sprocket wheel.

An object of the invention, accordingly, is to provide a chain device in which each link plate engages the buffer ring at a zero-degree angle or a very small angle with respect thereto, when a radially inner portion of the link plate is brought into contact with the buffer ring. Thus, smooth engagement of the chain and buffer ring with each other is ensured, and noise prevention is effectively attained.

Another object of the invention is to provide a chain device in which, at the time of engagement between each link plate and the buffer ring, substantially the entirety of the radially-inner portion of the link plate engages the buffer ring so that the contact pressure therebetween is uniformized. Thus, wear of the buffer ring is prevented so as to further improve the durability of the buffer ring, as well as to ensure noise prevention.

Other objects and details of the invention will become apparent from the following description, when read in conjunction with the accompanying drawings.

DETAILED DESCRIPTION OF PREFERRED EMBODIMENTS

Figure 1:
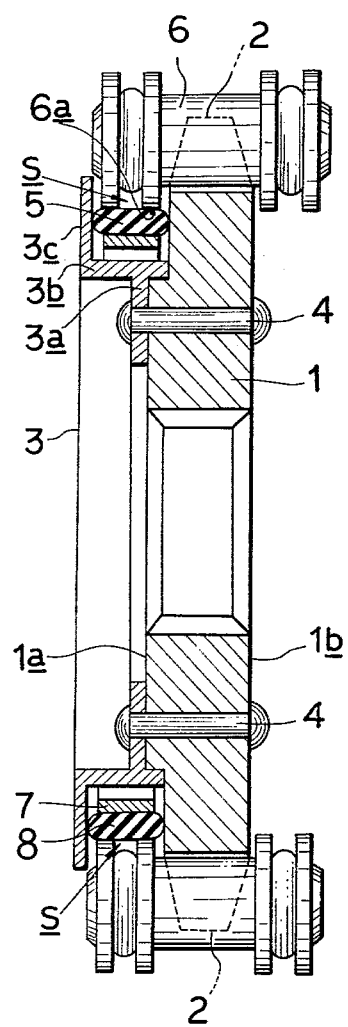
FIG. 1 is a longitudinally sectioned view of a sprocket wheel provided with the device according to the invention.

With reference to FIG. 1, a sprocket wheel 1 having a number of teeth 2 may be either a drive sprocket wheel or a driven sprocket wheel. A retainer member 3 in the form of a ring having a stepped portion is secured by rivets 4 to one side 1a of the sprocket wheel 1. The member 3 is formed from a steel plate with a press or the like, and comprises a base portion 3a secured by rivets 4 to sprocket wheel 1, an intermediate portion 3b extending from base portion 3a at right angles to the side of sprocket wheel 1, and a retaining wall portion 3c extending at right angles to portion 3b, in the radially-outward direction of sprocket wheel 1. An annular space S which is open only on the radially outer side of sprocket wheel 1 is defined by side 1a of sprocket wheel and retaining wall portion 3c which form both sides of space S, and intermediate portion 3b forming the bottom thereof. Annular space S is provided adjacent to the outer periphery of sprocket wheel 1 and inward with respect to teeth 2, and has a constant width over the circumferential direction of sprocket wheel 1.

A buffer plate spring ring 5 is rotatably disposed in annular space S, and is held on the side 1a of sprocket wheel 1 by retainer member 3. Although in the illustrated embodiment only a single buffer ring 5 is provided on one side of sprocket wheel 1, it is also possible to provide a pair of buffer rings on both sides of sprocket wheel 1, i.e., to provide another buffer ring on the other side 1b of the sprocket wheel 1 by a similarly-formed retainer member. The buffer ring 5 has an outer diameter greater than the inner diameter dimension of the semicircular-shaped curved portion of chain 6 in mesh with teeth 2 of sprocket wheel 1. Thus, with engagement of radially-inner portion 6a of the links of chain 6 with the outer periphery of buffer ring 5, a free portion 5a (FIG. 3) of buffer ring 5 not restrained by chain 6 is deformed into an elliptical form protruding radially outwardly. The elliptically deformed buffer ring 5 is held without being detached from sprocket wheel 1 by retaining wall portion 3c of retainer member 3, and is always rotatably held within annular space S.

Figure 2:
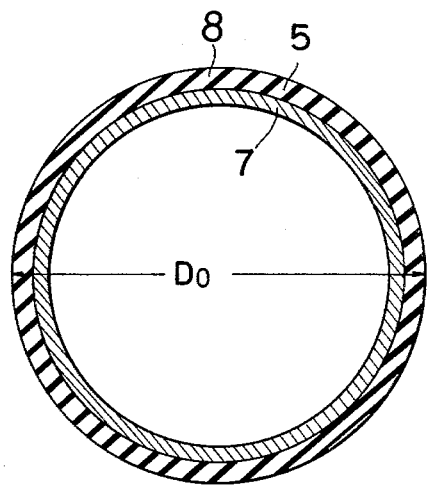
FIG. 2 is a sectional view of a buffer ring.

The buffer ring 5 comprises inner and outer members 7 and 8, respectively, as shown in FIG. 2. Inner member 7 comprises a base, and is formed by shaping a steel spring plate into the form of a ring. Outer member 8 is formed by shaping a material having flexibility and elasticity, such as hard rubber or plastic, into the form of a ring. The outer member 8 serves as a buffering member, and is bonded to the outer periphery of spring plate base 7 by means of baking so as to cover base 7, thus forming buffer ring 5.

Figure 3:
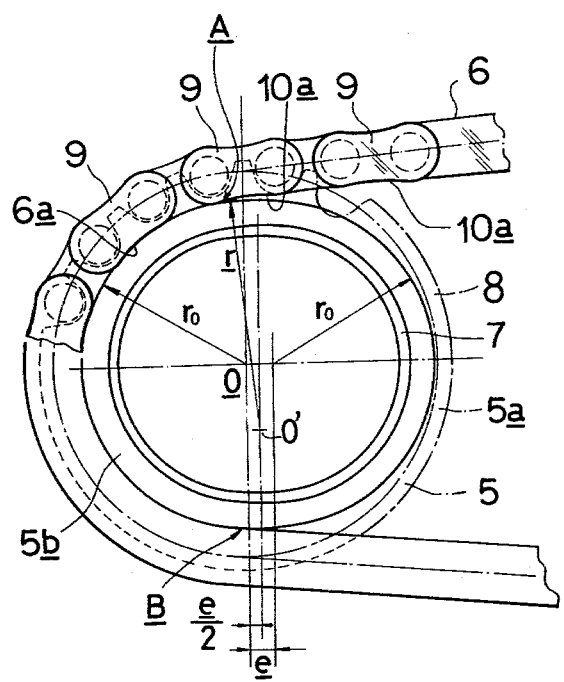
FIG. 3 is a schematic side view showing the buffer ring in a deformed state brought about at the time of meshing engagement of the chain with the sprocket wheel.

FIG. 3 shows the buffer ring 5 deformed into an elliptical form as a result of meshing engagement of chain 6 with sprocket wheel 1. Designated at O is the center (i.e., journalled portion) of sprocket wheel 1. The radially outer side of one half 5b of buffer ring 5 restrained by radially inner portions 6a of the links of chain 6 has the same radius r of curvature as the inner diametrical dimension of the links or chain. A free portion 5a of the ring located opposite to the above-described half 5b is deformed likewise, and therefore buffer ring 5 is deformed into an elliptical form protruding radially outwardly. At this time, a portion A of the chain, corresponding to the start of meshing between chain 6 and sprocket 1, as well as a portion B corresponding to the start of meshing at the time of reverse running of the chain, substantially coincide with portions of the elliptically deformed buffer ring 5 transversing the minor axis of the ellipse. The radius r of curvature of the ellipse, i.e., the outer periphery of buffer ring 5 corresponding to the starting portion A or B of the meshing between the chain and sprocket, is the maximum radius of curvature of the entire periphery of buffer ring 5.

Figure 4:
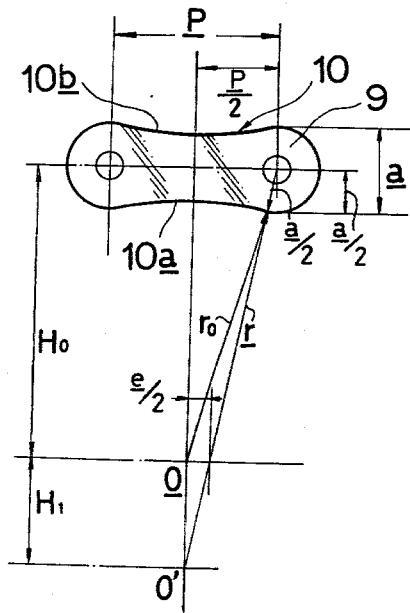
FIG. 4 is a side view of a link plate forming the chain.

FIG. 4 shows an exemplary plate line 9 of the links forming chain 6. Plate link 9 has a cocoon-like shape in elevation with depressions 10 on both upper and lower sides thereof. The depressions 10 are formed to be of a curved shape, particularly the depression 10a on the lower side in FIG. 4, which is adapted to engage the outer periphery of buffer ring 5, such that the radius r of curvature of depression 10a coincides with the maximum radius of curvature of buffer ring 5. To simplify the manufacture of link plate 9, the opposite side depression 10b not adapted to engage the outer periphery of buffer ring 5 may be formed to have the same radius r of curvature.

The value of the maximum radius of curvature can be obtained in the following manner, by way of example.

Denoting the diameter of buffer ring 5 in the state of a true circle as shown in FIG. 2 by $D_0$, the length L of the outer circumference of buffer ring 5 is:

$$L = \pi \times D_0.$$

When buffer ring 5 is restrained by chain 6 and deformed into an elliptical shape, as shown by solid line in FIG. 3, L is:

$$L \approx 2r_0 \times \pi + 2e$$

where e is the ellipticity to give rise to the maximum radius r of curvature and is given as:

$$e \approx \frac{\pi(D_0 - 2r_0)}{2}.$$

The distance $H_0$ from the center O of sprocket wheel 1 to the center of link plate 9 in the height direction thereof is:

$$H_0 = \sqrt{(r_0 + \frac{a}{2})^2 - (\frac{P}{2})^2} \quad (1)$$

and the distance $H_1$ from the center O of sprocket wheel 1 to the center O' of the portion of the outer periphery of buffer ring 5 having the maximum radius r of curvature is:

$$H_1 = H_0 \times \frac{\frac{e}{2}}{\frac{P}{2}} \quad (2)$$

In these equations a represents the height of link plate 9, and P the pitch length of chain 6.

From equations (1) and (2) the maximum radius r of curvature is:

$$r = \left[ \sqrt{(H_0 + H_1)^2 + (\frac{P}{2})^2} \right] - \frac{a}{2} \quad (3)$$

While the maximum radius r of curvature is theoretically obtainable as set forth above, with the above comprising exemplary basic calculations, in practice it is of course determined within a permissible range, within which the function of the buffer ring can be obtained, by taking permissible dimensional errors of the buffer ring, sprocket wheel and chain into consideration.

The operation of the above construction will now be described hereinbelow.

As chain 6 runs in meshing engagement with sprocket wheel 1, the radially inner portion 6a of the links of chain 6 engages the outer periphery of buffer means 8 because the outer diameter dimension of buffer ring 5 is greater than the inner diameter dimension of the links forming the semicircular-shaped curved portion of chain 6. At the same time, the deformation of the entire shape of buffer ring 5 provided with an elastic property is always repeated, and consequently the impact energy that would otherwise be exerted to sprocket wheel 1 is absorbed, thus providing an additional effect of reducing the noise, i.e., the sound of impact.

With the running of chain 6, buffer ring 5 is rotated along with chain 6 and sprocket wheel 1 while ring 5 is displaced with respect to them in the opposite direction within annular space S by the reaction force to the rotation of chain 6, while maintaining the elliptical form as a whole.

When chain 6 and sprocket wheel 1 start to mesh with each other at the mesh start portion A or B, the outer periphery of buffer ring 5 engages the radially inner depressed portion 10a of link plate 9, depressed portion 10a having the same radius of curvature as the maximum radius r of curvature of buffer ring 5. Therefore, surface contact between ring 5 and link plate 9 takes place. With such surface contact, the load or contact surface pressure applied between buffer ring 5 and link plate 9, which are brought into contact with each other at the mesh start portion A (or portion B at the time of reverse running of chain 6) with great contact pressure due to the restoring resilient force of the elliptically deformed buffer ring 5, is uniformized. In other words, the energy of chain 6 at the time that chain 6 comes into meshing engagement with sprocket wheel 1 with a great impact energy is effectively absorbed and alleviated by engagement of the entirety of the radially-inner surface of link plate 9 with the outer periphery of buffer ring 5, so that wear of buffer ring 5 is effectively reduced. Further, because the curved shape of depressed protion 10a of link plate 9 has the same radius of curvature as the maximum radius r of curvature of the outer periphery of buffer ring 5, link plate 9 comes into contact with buffer ring 5 at the mesh start portion A or B at a substantially zero-degree of angle. Thus, chain 6 is brought smoothly into engagement with buffer ring 5, so that generation of noise can be prevented with enhanced effectiveness.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims, rather than by the foregoing description.

We claim:
1. a chain device comprising:
   a sprocket wheel;
   a buffer ring provided on one side of said sprocket wheel for rotation relative thereto;
   a chain meshing with said sprocket wheel, said chain including a plurality of link plate pairs;
   said buffer ring having an outer diameter greater than the inner diameter dimension of a semicircular-shaped portion of said chain which is in mesh with said sprocket wheel; and
   each of said link plates being provided with a depressed portion having a curved shape coinciding, in the radius of curvature thereof, with the maximum radius of curvature of the outer periphery of said buffer ring when said buffer ring is deformed into an elliptical shape by meshing engagement between said chain and said sprocket wheel.

2. A chain device in accordance with claim 1, wherein:
   said maximum radius of curvature is obtained in a portion of said buffer ring corresponding to the start of meshing engagement between said chain and said sprocket wheel.

3. A chain device in accordance with claim 1, wherein:
   said sprocket wheel includes a retainer member for retaining said buffer member; and
   said retainer member is secured to at least one side of said sprocket wheel adjacent the outer periphery of said sprocket wheel.

4. A chain device in accordance with claim 3, wherein:
   said retainer member includes a bottom portion extending at right angles from the side of said sprocket wheel and a retaining portion extending from the outer edge of said bottom portion in the radially-outward direction of said sprocket wheel;
   an annular space open in the radially-outward direction of said sprocket wheel is defined by the side of said sprocket wheel, said bottom portion of said retainer member, and said retaining portion of said retainer member; and
   said buffer ring is disposed in said annular space.

5. A chain device in accordance with claim 1, 2, 3 or 4, wherein:
   said buffer ring includes a substantially resilient radially-inner member in the shape of a ring, and a radially-outer member formed of a substantially elastic material.

6. A chain device in accordance with claim 5, wherein:
   said radially-inner member is formed of a spring plate; and
   said radially-outer member is formed of hard rubber.

7. A chain device in accordance with claim 5, wherein:
   each of said link plates is substantially cocoon-shaped.

* * * * *